United States Patent [19]

Hodges

[11] Patent Number: 4,760,981
[45] Date of Patent: Aug. 2, 1988

[54] HEATING BOOT HANGER ASSEMBLY

[76] Inventor: Bonnie E. Hodges, 761 Palmer Dr., Greenville, Mich. 48838

[21] Appl. No.: 938,048

[22] Filed: Dec. 4, 1986

[51] Int. Cl.⁴ ............................................. F16L 5/00
[52] U.S. Cl. ....................................... 248/57; 248/58; 248/343; 403/97; 403/405.1
[58] Field of Search .................. 248/57, 58, 65, 217.2, 248/217.3, 71, 546, 343, 316.7, 544, DIG. 6, 341, 342; 403/97, 405.1

[56] References Cited

U.S. PATENT DOCUMENTS

| | | | |
|---|---|---|---|
| 796,178 | 8/1905 | Beaton | 248/57 |
| 2,528,418 | 10/1950 | Buckels | 248/57 |
| 2,809,002 | 10/1957 | Rudolph | 248/57 |
| 2,965,342 | 12/1960 | Goldstone | 248/57 |
| 3,104,087 | 9/1963 | Budnick et al. | |
| 3,162,413 | 12/1964 | Hexdall | 248/71 |
| 3,163,386 | 12/1964 | Collins | 248/57 X |
| 3,327,606 | 6/1967 | Little et al. | |
| 3,425,655 | 2/1969 | Cogdill | |
| 3,518,421 | 6/1970 | Cogdill | 248/57 |
| 3,606,217 | 9/1971 | Leiferman | 248/57 X |
| 3,913,773 | 10/1975 | Copp et al. | |
| 4,165,851 | 8/1979 | Bowden et al. | 248/57 |
| 4,406,216 | 9/1983 | Hott et al. | |
| 4,577,824 | 3/1986 | Druffel et al. | 248/57 X |

Primary Examiner—Ramon O. Ramirez
Attorney, Agent, or Firm—Varnum, Riddering, Schmidt & Howlett

[57] ABSTRACT

A hanger assembly (10) for supporting duct work such as heating boots (12) having telescoping brackets (16) for supporting the duct work and, further, having a clip (14). The clip (14) is adapted to slidably receive the telescoping hanger brackets (16). The clip is also adapted to mount the duct work to the hanger brackets (16) in a slidable fashion.

8 Claims, 5 Drawing Sheets

HEATING BOOT HANGER ASSEMBLY

FIELD OF THE INVENTION

This invention relates to hanger assemblies for mounting duct work in a ceiling. In one of its aspects, the invention relates to a hanger assembly adapted to mount a heating boot between ceiling joists.

BACKGROUND OF THE INVENTION

Traditionally, heating boots have been attached between joists in houses by nailing 2×4's between the joists and nailing the boot to the 2×4's. The 2×4's must be cut to size and shape the appropriate distance apart in order to support the boot. This process is time consuming and requires a great deal of dexterity by the installer because the installer must hold the boot and the 2×4s while attempting to nail the 2×4s to the joists.

A number of references have utilized telescoping brackets to mount equipment between ceiling joists. For example, Hexdall U.S. Pat. No. 3,162,413, issued Dec. 22, 1964, discloses a bar hanger having slidable ends mounted thereon. U.S. Pat. No. 4,165,852, to Bowden, Jr., et al. issued Aug. 28, 1979, discloses an adjustable, lockable bar hanger having telescoping male and female members for hanging electrical ceiling boxes between a pair of joists. U.S. Pat. Nos. 3,518,421, Cogdill issued June 30, 1970; 3,163,386, Collins issued Dec. 29, 1964; and 2,965,342, Goldstone issued Dec. 20, 1960 all disclose the use of telescoping members.

The use of prongs to secure a bracket in place is also known. For example, the patents to Hexdall, Bowden, Collins, Goldstone, and Cogdill all disclose the use of prongs, retaining points, nailing points, or other mounting tangs.

SUMMARY OF THE INVENTION

According to the invention, there is provided a hanger assembly for supporting duct work such as a heating boot. The hanger assembly includes telescoping hanger brackets for supporting the duct work. The hanger assembly also includes a clip which is adapted to slidably engage the telescoping hanger brackets. This clip is adapted to mount the duct work to the hanger brackets. The clip has guide straps formed integrally therewith for receiving the telescoping hanger brackets.

The telescoping hanger brackets have an elongated L-shape. The elongated leg of the hanger bracket can have a rib extending along its length which is adapted to correspond in a male/female manner with a corresponding hanger bracket. The shorter leg of the L-shaped hanger bracket has an outwardly extending prong struck therefrom. This prong is adapted to be pressed into a ceiling joist.

The clip has a substantially V-shaped configuration. This V-shape is formed by an upwardly extending back wall and an upwardly extending forward wall. The clip is adapted to slidably mount a downwardly extending edge of duct work in the notch of the V formed by these two upwardly extending portions.

The upwardly extending forward portion of the V-shaped clip has the guide straps formed therein to slidably receive the telescoping hanger brackets.

The clip also includes a horizontally extending rectangular portion having an aperture therethrough. This central portion is located between the guides and can be utilized to secure a register or grate over the heating bracket.

BRIEF DESCRIPTION OF THE DRAWINGS

The invention will now be described with reference to the accompanying drawings in which.

DETAILED DESCRIPTION OF THE DRAWINGS

Figure 1:
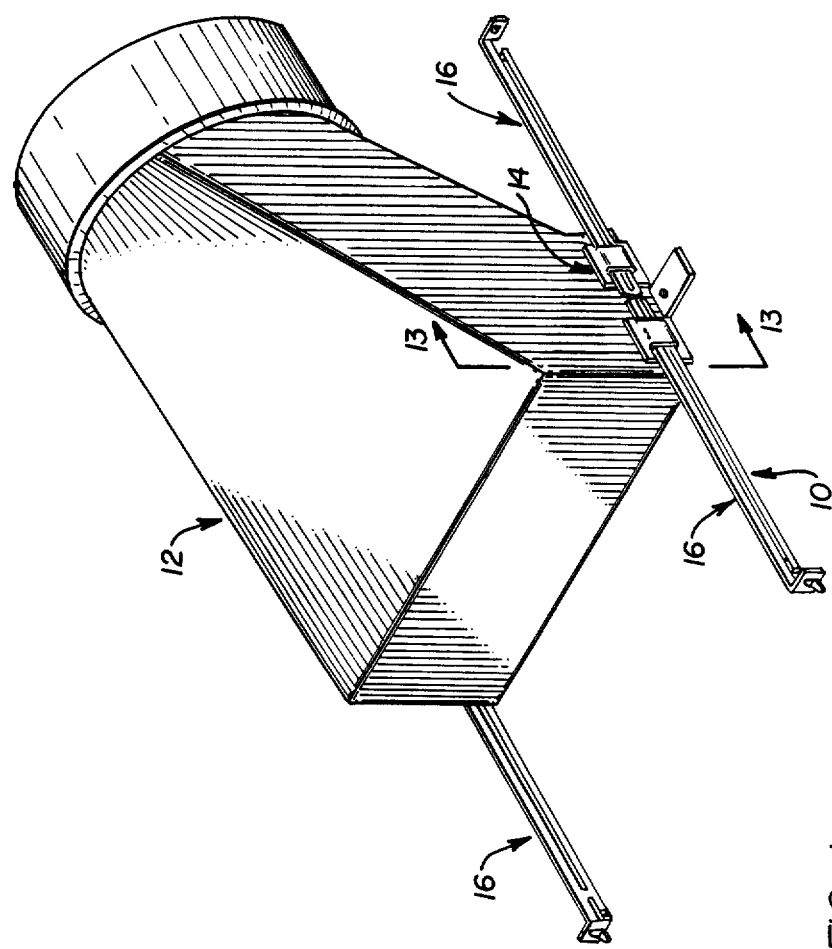
FIG. 1 is a perspective view of a heating boot and a hanger assembly according to the invention.
Figure 2:
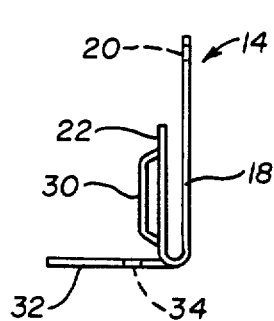
FIG. 2 is an end view of a clip which comprises part of a hanger assembly according to the invention.
Figure 3:
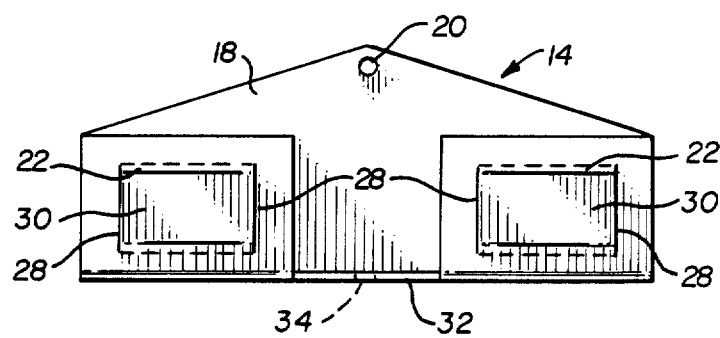
FIG. 3 is a front view of the clip shown in FIG. 2.

Referring now to the drawings and to FIGS. 1–5 and 13 in particular, there is shown a heating boot hanger 10 and a heating boot 12. The heating boot hanger 10 is adapted to mount the heating boot between ceiling joists (not shown) or, alternatively, to mount the heating boot on T-bars of a suspended ceiling system (not shown). Heating boot hanger 10 comprises a clip 14 and elongated straps 16. As can best be seen in FIG. 2, the clip 14 has a V-shape and has an upwardly extending back wall 18. As can be seen in FIG. 3, back wall 18 is somewhat rectangular in shape, having a slightly peaked upper edge. An aperture 20 extends through back plate 18 near the peaked upper edge thereof and is adapted to receive a self-tapping metal screw (not shown) for securing the clip 14 to the heating boot 12.

Figure 4:
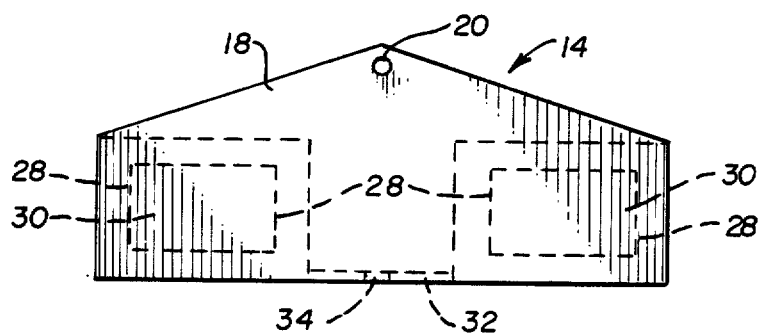
FIG. 4 is a rear view of the clip shown in FIG. 2.

The V-shaped clip 14 further comprises a front portion which, as can best be seen in FIGS. 3 and 4, includes two rectangular outer panels 22 which extend upwardly along a vertical plane parallel to the plane of back panel 18. The upwardly extending panels 22 are somewhat lesser in vertical height than back panel 18. Each front panel 22 has a pair of parallel vertical slits extending therethrough. As can be seen in FIG. 2, the material comprising front panel 22 intermediate between the two parallel slits extends outwardly so as to form a guide 30. Each guide 30 is adapted to receive elongated straps 16 therethrough. In this manner, elongated straps 16 can be mounted to clip 14, and in turn, to heating boot 12 to mount heating boot 12 to ceiling joists or ceiling support members.

Figure 5:
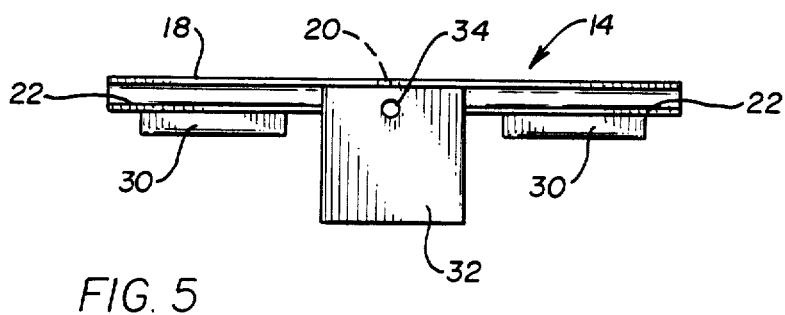
FIG. 5 is a top view of the clip shown in FIG. 2.

As can best be seen in FIG. 5, clip 14 includes a central portion 32 located between upwardly extending front portions 22. Central portion 32 is formed in a horizontal plane perpendicular to the planes of upwardly extending front panels 22. Central portion 32 has a rectangular shape and has an aperture 34 extending therethrough. Aperture 34 is adapted to receive a self tapping metal screw 11 for securing a heating register or grate 13 to clip 14.

Figure 6:
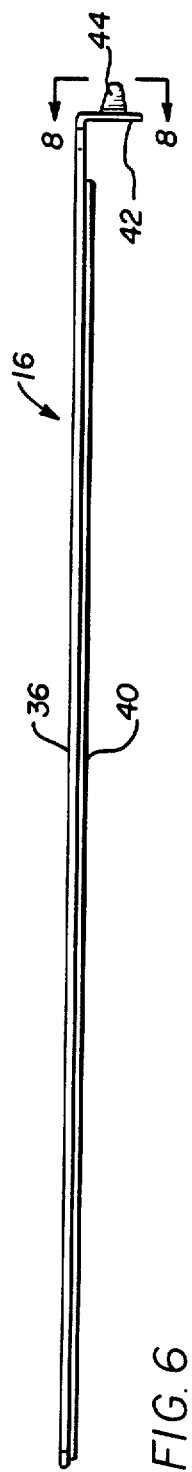
FIG. 6 is a top view of an elongated strap which comprises part of a hanger assembly according to the invention.
Figure 7:
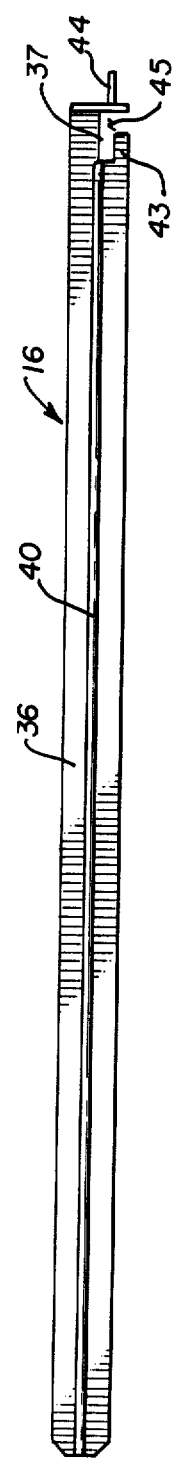
FIG. 7 is a side view of the strap shown in FIG. 6.
Figure 8:
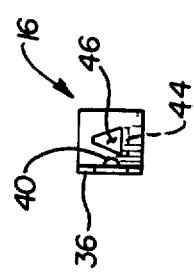
FIG. 8 is an end view of the strap shown in FIG. 6 taken along line 8—8 in FIG. 6.

Each hanger assembly 10 includes at least two elongated straps 16 as shown in FIG. 1. For the purposes of illustration, only one strap is shown in FIGS. 6–8. It should be understood, however, that an elongated strap (not shown) corresponds to each illustrated strap and is adapted to mate therewith. As can best be seen in FIG. 6, hanging strap 16 has a somewhat L-shape configuration. The strap 16 has an elongated rectangular portion 36 and a shorter, inwardly turned end portion 42. Elongated portion 36 is rectangular in shape and has an elongated ridge 40 extending along its length. Elongated ridge 40 is struck from elongated portion 36 so that an elongated depression (not shown) corresponds to elongated ridge 40 on the opposing surface of elongated portion 36. This elongated ridge/depression configuration facilitates the mating of the elongated strap 16 shown with its corresponding strap (not shown). In some cases, it may be desirable to eliminate the ridge/depression configuration in the strap 16. Elongated portion 36 further has a notch 37 therein at a lower edge thereof near end portion 42. This notch 37 is adapted for mounting hanging strap 16 on T-bars (not shown) in a suspended ceiling system. This notch 37 is formed by an elongated recess in strap 16. A portion of rectangular portion 36 extends beyond the terminus of the recess so as to form a T-bar lock 43. T-bar lock 43 forms a tab which is bendable so that it can be bent in one direction so as to temporarily increase the size of an opening 45 formed between T-bar lock 43 and end portion 42. In this manner, an upper, somewhat enlarged portion of a suspended ceiling support bar (not shown) can be inserted into notch 37 and T-bar lock 43 can be bent in a second direction so as to lock the strap 16 to the suspended ceiling. In this manner, the clip 14 and, in turn, heating boot 12, can be mounted above a suspended ceiling, beneath or in the absence of ceiling joists. Aperture 34 is adapted to receive a self-tapping metal screw or other fastener 15 for mounting a grate 13 (FIG. 13) to clip 14 and, in turn, to heating boot 12.

As can be seen in FIG. 8, end portion 42 is rectangular or square in shape and has a triangular, pointed prong 44 struck therefrom. Prong 44 extends outwardly from end portion 42 and is adapted to be pressed or driven into a ceiling joist for temporarily mounting hanging strap 16, and in turn, clip 14 and boot 12 to the joist. The manner in which prong 44 is struck from end portion 42 provides an aperture or nail hole 46 extending through end portion 42. This aperture or nail hole 46 is adapted to receive a nail (not shown) driven through the aperture and into the ceiling joist after the triangular prong 44 has temporarily secured the hanging bracket strap 16 in place. In this manner, hanging strap 16 can be secured in place in a relatively permanent fashion.

In use, a lower edge of heating boot 12 can be seated within the bight portion of V-shaped clip 14. If desired, heating boot 12 can be more securely mounted to clip 14 by means of a self-tapping metal screw (not shown) extending through aperture 20 to secure back panel 18 to heating boot 12. The clip 14 can be seated in the sides of the boot, as shown in FIG. 1, or can be seated in the front and back face of the boot (not shown) so that the boot can be secured to joists which run parallel to the ductwork. A worker holding heating boot 12 with one hand can simply extend telescoping hanger straps 16 so that the straps reach the adjoining joists or other fixed support. The triangular prongs 44 can then be pressed or gently tapped into the joists to hold the hanging straps and, in turn, the heating boot in place. If desired, a nail can be driven through aperture 46 in end portion 42 to more permanently secure the hanger assembly and, in turn, the heating boot in place. In the event that no ceiling joists are conveniently available for supporting the heating boot, or it is desirable to mount the boot beneath the joists to a suspended ceiling, the hanger straps 16 can be mounted on T-bars of a suspended ceiling system by means of notches 37.

After hanging straps 16 have been secured in place, the lateral position of heating boot 12 can be adjusted somewhat by moving clip 14 with respect to hanger straps 16.

As can be seen in FIGS. 6–8, the construction of elongated straps 16 is relatively simple and is adapted to formation by means of simple bending, striking and other metal forming operations from a single rectangular piece of sheet metal. In particular, an elongated rectangular piece of sheet metal can be formed so as to include elongated ridge 40. Notch 38 and prong 44 can be struck from the elongated piece of sheet metal and a bend placed therein to form end portion 42. Thus, each strap 16 can be formed utilizing very simple and very inexpensive techniques.

Clip 14 can be formed from a somewhat rectangular piece of sheet metal. Drilling operations can be utilized to form apertures 34 and 20. Cutting operations can be utilized to form slits 30 and to separate central portion 32 from front panels 22. Bending and/or forming operations can then be utilized to form the V-shape of clip 14, to form central portion 32 into its horizontally extending position, and to extend the portions between slits 30 so as to form guides 30.

Thus, simple drilling, cutting, and bending operations can be utilized to form clip 14. It can therefore be seen that the hanger assembly 10 is relatively simple and inexpensive, yet saves a workman time and effort in installing a heating boot by permitting the boot to be installed in a ceiling by a single worker utilizing one hand to initially secure the boot in place. The clip 14 is adapted to mount to any type of boot, regardless of size and shape, and is adapted to mount to any configuration of joists, trusses, or ceiling configuration. The hanger assembly is thus very versatile as well as very easy to use.

As can be seen in FIGS. 9–12, the invention can also comprise a different embodiment of the clip 114. As can best be seen in FIG. 11, clip 114 is substantially L-shaped, having a vertical portion 118 and a horizontal portion 132. A plurality of straps 130 are struck from vertical portion 118 and pressed forwardly so as to form guides adapted to receive straps 16 for supporting the hanger.

Figure 10:
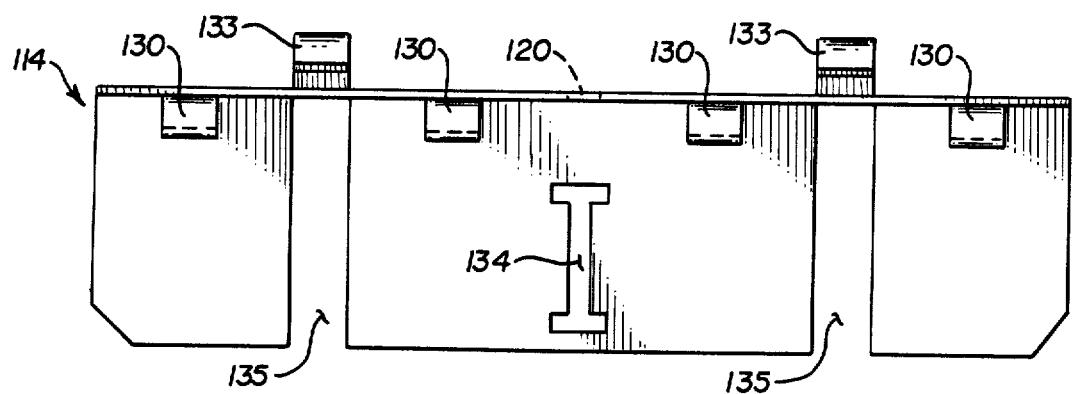
FIG. 10 is a top view of the clip shown in FIG. 9.
Figure 11:
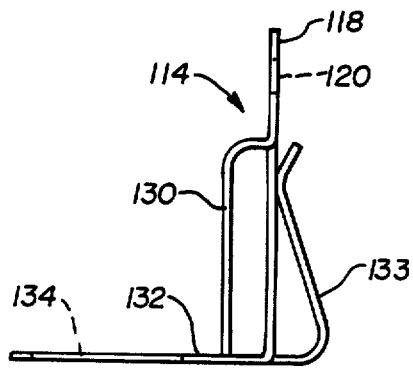
FIG. 11 is an end view of the clip shown in FIG. 9.
Figure 12:
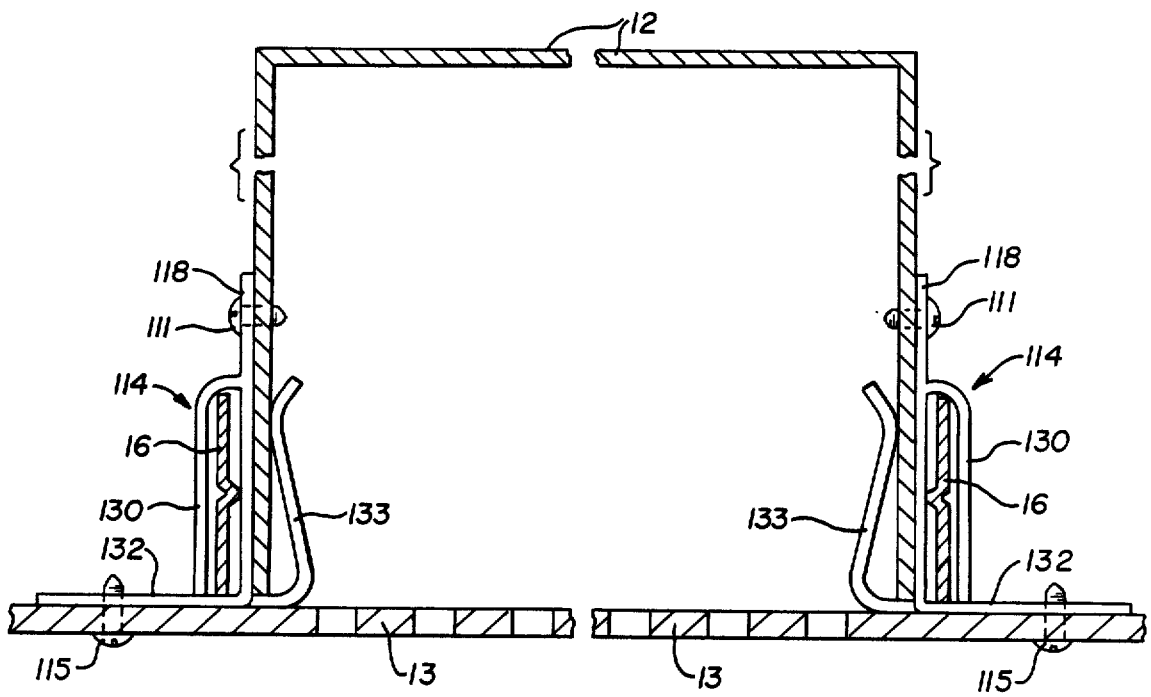
FIG. 12 is a sectional view of the embodiments of the invention shown in FIGS. 9–11 in assembled form with a heating boot and a register.
Figure 13:
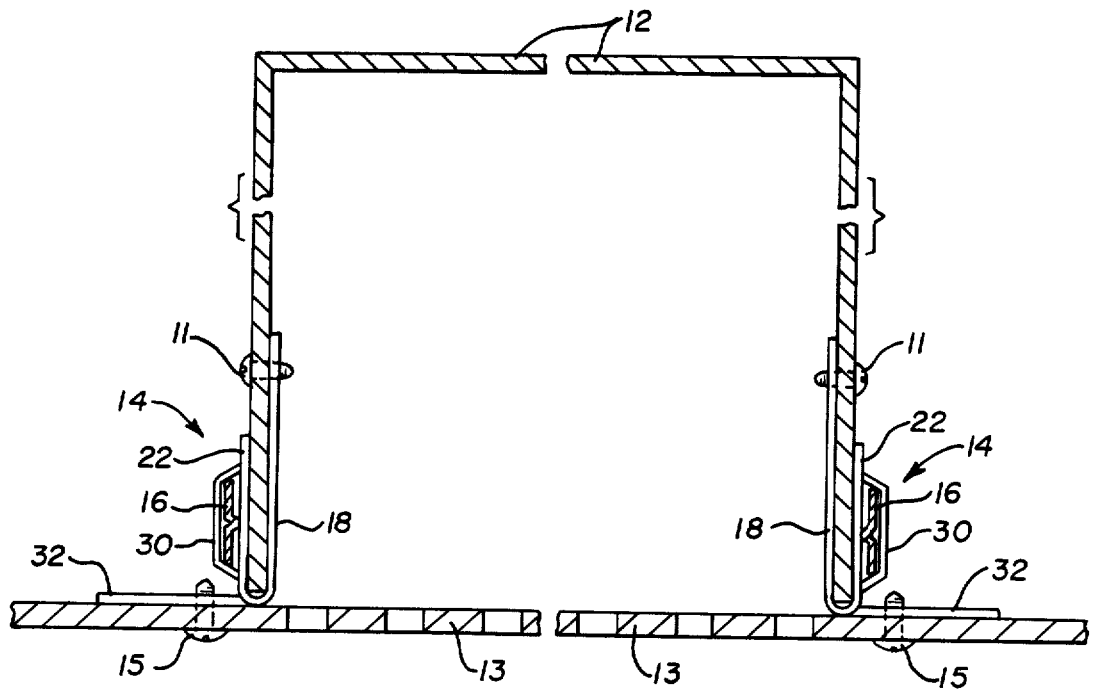
FIG. 13 is a sectional view of the first embodiment of the invention taken along line 13—13 of FIG. 1 and with a register secured to a heating boot.

As can best be seen in FIGS. 10 and 12, rectangular sections of horizontal portion 132 (as can be seen in FIG. 11) extend rearwardly and upwardly so as to form rear clips 133. Rear clips 133 are adapted to receive a lower edge of a piece of duct work (such as a heating boot 12). In this manner, the duct work can be firmly engaged by clip 114. As a result of the formation of rear clips 133, slots 135 are formed in clip 114.

Figure 9:
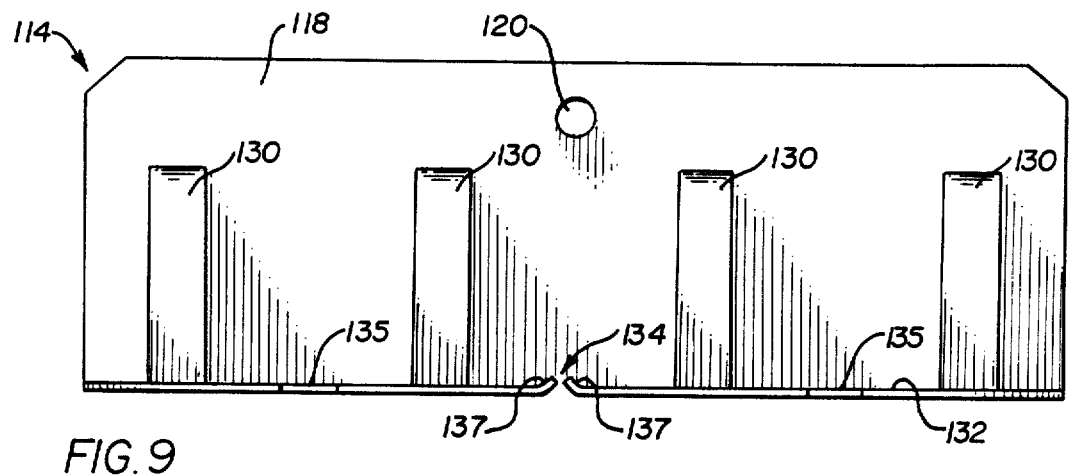
FIG. 9 is a front view of another clip according to the invention.

Vertical portion 118 has an aperture 120 extending therethrough adapted to receive a pop rivet or screw 11 for securing clip 114 to the heating boot 12 or other duct work (not shown). As can best be seen in FIG. 10, horizontal portion 132 has an I-shaped slot 134 extending therethrough adapted to receive screws 115 for securing a grate or register 13 to clip 114. As can be seen in FIG. 9, longitudinal edges 137 of slot 134 are up-turned so as to accommodate the placement of screws (not shown) therethrough and to resist removal of said screws.

In use, clip 114 is utilized and functions in a manner substantially the same as has been previously described with respect to clip 14.

Reasonable variation and modification are possible within the scope of the foregoing disclosure and drawings without departing from the spirit of the invention.

The embodiments of the invention in which an exclusive property or privilege is claimed are defined as follows:

1. A hanger assembly for supporting duct work, such as a heating boot, having telescoping, elongated brackets for supporting said duct work and a clip means for connecting said brackets to said duct work, the improvement comprising:

said clip means having guide straps formed integrally therefrom for slidably receiving said telescoping brackets.

2. A hanger assembly according to claim 1 wherein said guide straps are struck from a vertically extending portion of said clip.

3. A hanger assembly according to claim 2 wherein said vertically extending portion of said clip means forms a back portion and a forwardly disposed front portion together forming a V-shaped member adapted to receive an edge of said duct work therebetween.

4. A hanger assembly according to claim 2 wherein said clip means comprises an L-shaped member having at least one portion thereof bent downwardly and rearwardly so as to be adapted to receive an edge of said duct work.

5. A hanger assembly according to claim 2 wherein said clip means has an aperture extending therethrough so as to be adapted to mount a register in fixed relationship to said clip means.

6. A hanger assembly according to claim 2 wherein said telescoping hanger brackets comprise at least one pair of L-shaped elongated pieces, each having an elongated rib extending along the, longer leg thereof and an outwardly extending prong struck from the shorter leg thereof adapted to be pressed into a ceiling joist for mounting said telescoping hanger bracket to a ceiling joist.

7. A hanger assembly according to claim 6 wherein said telescoping hanger brackets have notches therein adapted for mounting said duct work from a suspended ceiling framework.

8. A hanger assembly according to claim 7 wherein said telescoping, elongated hanging brackets include a tab adapted to be bent in a first direction so as to increase the size of an opening of said notch so as to admit said suspended ceiling framework into said notch and to be bend in a second direction so as to decrease the size of said opening of said notch so as to lock said bracket to said suspended ceiling framework.

* * * * *